July 31, 1934.    H. NYQUIST    1,968,164
SYSTEM FOR MEASURING TRANSMISSION LOSSES AT VARIOUS FREQUENCIES Filed Dec. 17, 1931

INVENTOR
*H. Nyquist*
BY
ATTORNEY

Patented July 31, 1934

1,968,164

UNITED STATES PATENT OFFICE 1,968,164

SYSTEM FOR MEASURING TRANSMISSION LOSSES AT VARIOUS FREQUENCIES

Harry Nyquist, Millburn, N. J., assignor to American Telephone and Telegraph Company, a corporation of New York Application December 17, 1931, Serial No. 581,743

12 Claims. (Cl. 179—175.3)

It is among the objects of my invention to provide a new and improved system for comparing a network and a line or any two transducers to ascertain the "return loss" between them. Another object of my invention is to measure the return loss with a multi-frequency source. Still another object of my invention is to employ a "noise" standard source and apply it to the two transducers in balanced relation and note the integral return loss over the whole frequency range involved. Another object is to provide for measuring the transmission loss through a single transducer. All these objects and other objects and advantages of my invention will become apparent on consideration of an example of practice according to the invention which I have chosen for disclosure in the following specification. It will be understood that the following description relates primarily to this example of the invention and that the scope of the invention will be indicated in the appended claims.

Figure 1:
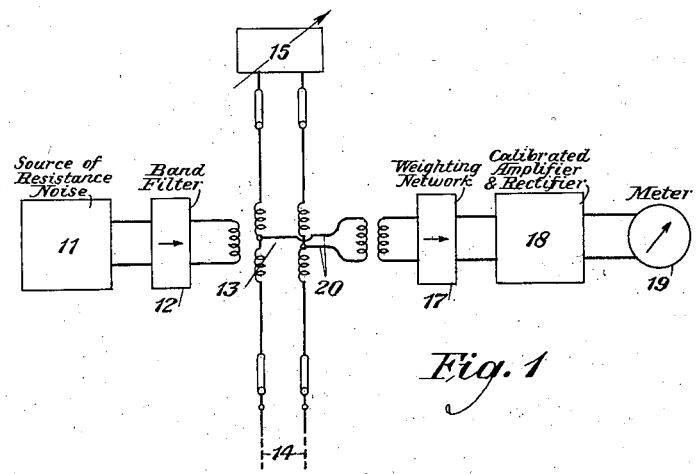
Figure 2:
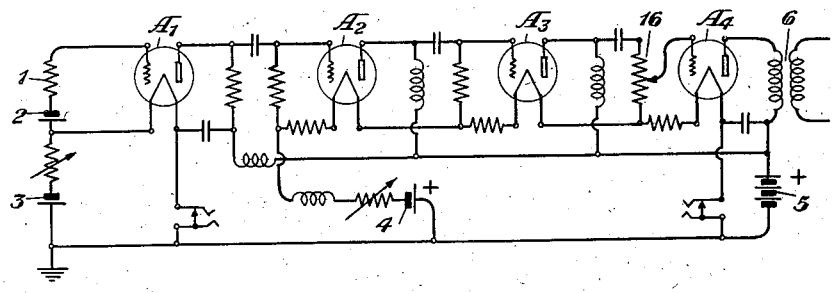

Referring to the drawing, Figure 1 is a diagram illustrating the practice of my invention for measuring the return loss between a line and a balancing network, and Fig. 2 is a diagram showing the noise source which is represented symbolically at 11 in Fig. 1.

Referring to Fig. 1, a line 14 and a balancing network 15 are connected to respectively opposite terminal pairs of a hybrid coil 13. It is desired to measure the integral return loss due to imperfection of balance, for currents of frequencies at uniform power level over a certain frequency range. In the case of telephone lines for voice transmission this range may be, say, from 300 cycles per second to 3,000 cycles per second.

The symbol 11 in Fig. 1 represents a source of composite current, the components being of all frequencies over a wide frequency range and these components being of substantially uniform power level throughout that range or a considerable portion thereof. The form that may be taken by this source 11 will be explained presently in connection with Fig. 2.

The composite output current from the source 11 goes through a band filter 12 which cuts the frequency range down as desired. For example, in the case where 14 is a line intended for telephone voice currents, the band filter 12 may pass components of frequency between 300 and 3,000 cycles per second.

This composite current passed by the band filter 12 goes into the hybrid coil 13 and induces a current that divides equally to the line 14 and the network 15, provided they are in perfect balance over the entire frequency range. In this case, there will be no current output on the output conductors 20 from the hybrid coil 13. But so far as there is an unbalance between the line 14 and the network 15 at any frequency within the range considered, there will be a corresponding output current in the conductors 20. The magnitude of this unbalance current will give an indication of the "return loss" in the comparison of the line 14 and the network 15. The more nearly perfect the balance and therefore the less the current in the conductors 20, the greater is the return loss. In other words, a high return loss corresponds to a good degree of balance and vice versa. The term "return loss" may cover any case of measurements by which impedances are compared.

The current in the conductors 20 goes through the primary winding of a transformer, and the induced current in its secondary winding goes through a weighting network 17. This element 17 may otherwise be called an attenuation modifier. Its use is optional. Its purpose is to enhance certain frequencies as compared to others, according to the importance of these frequencies in the intended operation of the line 14. Except as affected by the unbalance between line 14 and network 15, all frequencies are at approximately the same power level at the input of network 17. But in getting the integral return loss between the line 14 and the network 15, certain frequencies may be more important than others and they can be enhanced accordingly in the weighting network 17.

From the weighting network 17 the currents go through a calibrated amplifier-rectifier 18 and its output goes to the meter 19 where the indication gives the magnitude of the unbalance current or the so-called return loss.

Guided by the indication on the meter 19 the network 15 may be modified and adjusted so as to increase the return loss. The object of the adjustment of the network 15 will be to increase the return loss to the highest obtainable value.

The measurement of return loss by the method described herein is actually a measurement of transmission loss through the hybrid coil 13 considered as a transducer interposed between the band filter 12 and the weighting network 17.

If it is desired to examine the return loss at particular frequencies, this can readily be done by adjusting the band filter 12 to a narrow range with the desired frequency central in respect to that range; and if desired, the filter 12 can be adjusted to vary the central frequency with a narrow range adjacent thereto so as to get the return loss at various narrow frequency ranges.

Referring to Fig. 2, this represents in some detail a suitable source of composite current of a variety of frequency components. The series of three-electrode vacuum tube amplifiers $A_1$, $A_2$, $A_3$ and $A_4$ has its ultimate input on the grid side of $A_1$ and its output on the plate side of $A_4$. The grid circuit of the tube $A_1$ contains a resistance 1 and the thermal agitation of the molecules and the free electrons and the bound electrons in the resistance 11 gives rise to a random fluctuating electromotive force on the grid of the tube $A_1$. This varying electromotive force is amplified in successive stages from the tube $A_1$ to the tube $A_4$ so that the output current from the tube $A_4$ is a current that corresponds with the input electromotive force at $A_1$, having components at various frequencies over a wide range, and within a wide range these components are at nearly the same power level.

It is desirable to reduce amplifier noises, especially in the early stages, and therefore separate batteries 2 and 3 are employed, as shown, for the grid and the filament of the tube $A_1$. In the later stages a common source of battery 4 serves for the grids and filaments of the other tubes. There is a common plate battery 5, and a potentiometer 16 is provided to adjust the amplification. The output of the amplifier system shown in Fig. 2 goes through the transformer 6 to the band filter 12 in Fig. 1.

The thermionic or resistance noise determined by the resistance 1 in Fig. 2 is composed of all frequencies between zero and several million cycles per second. In the range below a few hundred thousand cycles per second, the power of the components within a narrow band of frequencies is substantially the same at all locations of this band. Therefore, assuming that the weighting network 17 has a level transmission characteristic, the meter 19 which gives an indication proportional to the root-mean-square value of the current will indicate an average value of return loss over the entire frequency range permitted by the band filter 12.

It has sometimes been the practice to obtain curves of return loss against frequency over a certain range and to speak of the return loss for that range as the minimum measured return loss within that range. On this basis one would speak of the loss around 1000 cycles as being the return loss of importance from an echo standpoint and one would speak of the return loss near the repeater cut-off as being of importance from a singing standpoint. It will be understood that though the absolute reflection may be greater at the higher frequencies, the transmitters and receivers cause the frequencies around 1000 cycles to be weighted heavily when echoes are concerned. It is quite obvious from an echo standpoint that the minimum return loss within a frequency range does not tell the whole story, rather some sort of integrated return loss over the audible range which would combine return losses at all frequencies according to some suitable law would be preferable. From a singing standpoint it is not so obvious that weighting of this sort is to be preferred. Singing occurs at one definite frequency and what matters is the return loss at that frequency. However, from the following considerations, it is apparent that a weighting network is desirable for singing also. If a two-wire repeater sings, it is because there is unbalance both to the east and to the west. The frequency at which singing occurs may not be a frequency at which either line has its minimum return loss, because at this frequency the other line may have a very high return loss, thus preventing singing. It will be seen that out of two networks having the same minimum return loss, one having a high return loss at all other frequencies is to be preferred to one having a return loss only slightly greater than the minimum. The exposition becomes more involved when a circuit having a number of repeaters is singing as a whole, but in all cases the conclusion is that the minimum return loss itself does not tell the whole story.

In addition to this reason for having weighting networks, there is also the reason that the gain of the repeater is a function of frequency. All two-wire repeaters have a filter in them which cuts off in the range where the return loss becomes low. It will be obvious that the significant return loss is not the measured loss simply, but rather the measured loss modified to take account of the repeater gain. For reasons indicated in the foregoing discussion a weighting network is advantageous.

In a fairly complete and specific aspect, the plan proposed in this specification is first to use resistance noise for measuring return loss or more generally to use a multi-frequency source; second, to use a weighting network; and third, to use an integrating device for detection so that the reading obtained will not be so much an indication of the minimum return loss within a range, but an integrated return loss giving due weight to return loss over the whole frequency range. The important practical advantage of the plan is that it produces a single reading instead of producing a curve as had been the case in previous practice.

The difference between the minimum return loss method and the integrating method may be shown by the procedure to adjust a building-out condenser to the optimum value. This condenser is adjustable say in steps of 0.001 mf and it is known that the correct value lies between .038 mf and .042 mf, both inclusive. The procedure in either case is to give the condenser these five values in turn and note the effect on the return loss. When the curve method with weighting network is used, that value of the condenser is selected which gives the greatest value for the minimum within the range. When the integrating method is employed the condenser is adjusted, and for each step of adjustment the single reading indicated on the integrating meter is noted, then the condenser which gives the highest reading is the correct one. The two methods are found to give substantially identical results. In practice the method involving reading an integrating device is much quicker and more convenient.

In the following claims the term network is used in a broad sense for any current receiving device, i. e., any device having a set of input terminals to receive current. In this sense a transmission line is an example of a network.

I claim:

1. The method of measuring the return loss between two networks over an extended frequency range, which consists in generating a resistance noise electromotive force and amplifying it and applying the amplifier output current to the two networks in balanced relation and measuring the unbalanced return current.

2. The method of measuring the return loss between two networks over a certain frequency range, which consists in generating a resistance noise electromotive force, amplifying it, applying the amplified current output to a band filter appropriate to the desired frequency range, then applying the filter output to the two networks in balanced relation and measuring the integral unbalanced return current.

3. The method set forth in claim 2, with the interposed step of passing the composite current through a weighting network to emphasize certain frequencies within the desired frequency range.

4. The method set forth in claim 2 subject to the step of adjusting the band filter to a narrow frequency range with adjusted central frequency so as to get a distinguishable return loss measurement at and about each of several different central frequencies.

5. In combination, a source of current determined by thermal molecular agitation in a resistance, means to apply this current equally to two networks in balanced relation, means to take off therefrom the unbalanced current, and a meter to measure the last mentioned current.

6. In combination, a source of current determined by the molecular and electronic agitation in a resistance, a band filter for said current, a hybrid coil having one pair of terminals connected to the output of said band filter, two networks to be compared connected to opposite pairs of terminals of the said hybrid coil, and a meter connected to the remaining pair of terminals of said hybrid coil.

7. In combination, a source of current determined by the molecular and electronic agitation in a resistance, a band filter for said current, a hybrid coil having one pair of terminals connected to the output of said band filter, two networks to be compared connected to opposite pairs of terminals of the said hybrid coil, a weighting network to pass the components of different frequencies unequally as desired from the remaining terminals of the hybrid coil, means to amplify and rectify the current from said last mentioned network, and a meter to measure the amplified and rectified current.

8. The method of measuring transmission loss through a transducer over a certain frequency range which consists in generating a resistance noise electromotive force with components at frequencies distributed over that range, applying the corresponding current as input to the transducer, and measuring the integral output current from the transducer to get the transmission loss.

9. The method of claim 6 with the interposed step of passing the transducer output current through a weighting network to emphasize certain frequencies within the desired frequency range.

10. In combination, a source of resistance noise electromotive force at various frequencies over a certain frequency range, a transducer having its input connected to receive the corresponding current, and means connected to the transducer output to measure the integral transmission loss through the transducer.

11. The method of measuring transmission loss through a transducer which consists in generating a current of definite frequency character, applying this current as input to the transducer, weighting a plurality of frequencies transmited through the transducer so that certain of these frequencies are enhanced with respect to the remainder of these frequencies, and measuring the weighted output.

12. In combination, a transducer through which transmission loss is to be measured, a generator of current of definite frequency character connected to the transducer input, a meter connected to the transducer output, and a weighting network interposed between said generator and meter, said weighting network transmitting a plurality of frequencies extending over a predetermined range and enhancing certain of these frequencies in a predetermined manner.

HARRY NYQUIST.